US012731507B2

(12) United States Patent
Wang

(10) Patent No.: US 12,731,507 B2
(45) Date of Patent: Sep. 8, 2026

(54) SPINE ADJUSTMENT JOINT WITH ANGLE ADJUSTMENT FOR CRASH TEST DUMMY

(71) Applicant: Humanetics Innovative Solutions, Inc., Farmington Hills, MI (US)

(72) Inventor: Zhenwen Jerry Wang, Farmington Hills, MI (US)

(73) Assignee: Humanetics Innovative Solutions, Inc., Farmington Hills, MI (US)

(*) Notice: Subject to any disclaimer, the term of this patent is extended or adjusted under 35 U.S.C. 154(b) by 267 days.

(21) Appl. No.: 18/685,986

(22) PCT Filed: Aug. 25, 2022

(86) PCT No.: PCT/US2022/041504
§ 371 (c)(1),
(2) Date: Feb. 23, 2024

(87) PCT Pub. No.: WO2023/028215
PCT Pub. Date: Mar. 2, 2023

(65) Prior Publication Data

US 2024/0355232 A1 Oct. 24, 2024

Related U.S. Application Data

(60) Provisional application No. 63/236,900, filed on Aug. 25, 2021.

(51) Int. Cl.
*G09B 23/32* (2006.01)

(52) U.S. Cl.
CPC .................................... *G09B 23/32* (2013.01)

(58) Field of Classification Search
CPC .... G09B 23/32; G09B 23/30; G01M 17/0078
See application file for complete search history.

(56) References Cited

U.S. PATENT DOCUMENTS 3,557,471 A 1/1971 Payne et al.
3,753,302 A 8/1973 Daniel
(Continued)

FOREIGN PATENT DOCUMENTS

CN 101354849 A 1/2009
CN 201329510 Y 10/2009
(Continued)

OTHER PUBLICATIONS

Carhs, "Conference Proceedings -Safety Testing", https://www.carhs.de/en/conference_proceedings.html, 2017, 2 pages.
(Continued)

*Primary Examiner* — Eddy Saint-Vil
(74) *Attorney, Agent, or Firm* — Howard & Howard Attorneys PLLC

(57) ABSTRACT

A spine adjustment joint for use in a spine assembly of an anthropomorphic device with the device used to achieve a human-like response in crash test simulations. The joint includes a lower bracket which is coupled to a lower spine assembly and an upper bracket which is coupled to an upper spine assembly. The spine adjustment joint also includes a joint member at least partially formed of an elastomeric material that is coupled to each of the upper and lower bracket with the joint member providing flexibility between the upper and lower spine assembly. The spine assembly also includes at least one fastener passing through one of the upper and lower brackets and mounted to the joint member to secure the upper spine assembly in the desired angular position relative to the lower spine assembly.

17 Claims, 9 Drawing Sheets

(56) References Cited

U.S. PATENT DOCUMENTS

| | | | | |
|---|---|---|---|---|
| 3,970,274 A | 7/1976 | Resk | | |
| 4,225,105 A | 9/1980 | Nakamura | | |
| 6,039,397 A * | 3/2000 | Ginat | A47C 1/03266 | 297/301.4 |
| 7,597,302 B2 * | 10/2009 | Lee | F16M 11/2021 | 248/371 |
| 7,878,080 B2 | 2/2011 | Hwang et al. | | |
| 9,965,977 B2 | 5/2018 | Been et al. | | |
| 2007/0058163 A1 | 3/2007 | Handman | | |
| 2013/0252220 A1 | 9/2013 | Wang | | |
| 2014/0190279 A1 | 7/2014 | Been et al. | | |
| 2016/0189569 A1 | 6/2016 | Been | | |
| 2016/0293060 A1 | 10/2016 | Wang et al. | | |

FOREIGN PATENT DOCUMENTS

| | | |
|---|---|---|
| CN | 202358470 U | 8/2012 |
| CN | 102717701 A | 10/2012 |
| CN | 202916064 U | 5/2013 |
| CN | 203445834 U | 2/2014 |
| CN | 203571659 U | 4/2014 |
| CN | 104197160 A | 12/2014 |
| EP | 0092314 A1 | 10/1983 |
| EP | 2770274 A2 | 8/2014 |
| EP | 3040960 A1 | 7/2016 |
| GB | 2344922 A | 6/2000 |
| GB | 2479879 A | 11/2011 |
| WO | 2008124642 A2 | 10/2008 |
| WO | 2020061572 A1 | 3/2020 |
| WO | 2021198642 A1 | 10/2021 |

OTHER PUBLICATIONS

English language abstract for CN 102717701 A extracted from espacenet.com database on May 17, 2024, 1 page.

English language abstract for CN 104197160 A extracted from espacenet.com database on May 17, 2024, 1 page.

English language abstract for CN 201329510 Y extracted from espacenet.com database on May 17, 2024, 1 page.

English language abstract for CN 202358470 U extracted from espacenet.com database on May 17, 2024, 1 page.

English language abstract for CN 203445834 U extracted from espacenet.com database on May 17, 2024, 1 page.

English language abstract for CN 203571659 U extracted from espacenet.com database on May 17, 2024, 1 page.

Global Engineering and Systems Analysis Company, Inc., "THOR-NT Users Manual 50% Male Frontal Dummy, Revisional 2005.1, NHTSA/GESAC, Inc.", Report No. GESAC-05-02, 280 pages.

International Search Report for Application No. PCT/US2022/041504 dated Dec. 23, 2022, 1 page.

Kistler, "Data Recorder Modules for In-Dummy Data Acquisition in Crash Testing/DTI375 Webpage", https://www.kistler.com/US/en/cp/data-recorder-modules-dti375/P0000879, 2017-2024, 3 pages.

Kistler, "Webpage", https://www.kistler.com/US/en/, 2017-2024, 5 pages.

Chinese Search Report for Application CN 202280070282.5 dated May 30, 2026, 3 pages.

* cited by examiner 181
158
214
216
218
210
212
$W_1$
$W_2$
$L_1$
$L_2$ 154
202
255
$L_3$
$W_3$
161
159
172
176
174
170
157
25°
45°
60°
162
190
160
200
163
152
153A
151
153
155A
155
185
180
182
184
$L_4$
$W_4$
187
167
156
20

SPINE ADJUSTMENT JOINT WITH ANGLE ADJUSTMENT FOR CRASH TEST DUMMY

CROSS-REFERENCE TO RELATED APPLICATION

The subject application is a National Stage of International Patent Application No. PCT/US2022/041504 filed on Aug. 25, 2022, which claims priority to and all the benefits of U.S. Provisional Patent Application No. 63/236,900 filed on Aug. 25, 2021, the disclosures of which are hereby incorporated by reference.

BACKGROUND OF THE DISCLOSURE

1. Field of the Disclosure

The present disclosure relates generally to Anthropomorphic Test Devices (ATD) and, more particularly, to spine assemblies for an ATD, and even more particularly to a spine adjustment joint used in a spine assembly for an ATD with the ATD being used to assess and predict injuries under crash, under body explosion and aerospace ejection seat testing environments.

2. Description of the Related Art

Automotive, aviation, military, and other vehicle manufacturers conduct a wide variety of collision, ejection and under-body-blast (UBB) testing to measure the effects of an impact upon a vehicle and its occupants. Through the testing, a vehicle manufacturer gains valuable information that can be used to improve the impact worthiness of the vehicle.

Impact testing often involves the use of anthropomorphic test devices, better known as "crash test dummies." During the testing, an operator places a crash test dummy inside a vehicle, and the vehicle undergoes a simulated collision, UBB, or ejection. The testing exposes the crash test dummy to high inertial loading, and sensors inside the crash test dummy, such as load cells, displacement sensors, accelerometers, pressure gauges, angular rate sensors, and the like, generate electrical signals of data corresponding to the loading. Cables or wires transmit these electrical signals of data to a data acquisition system (DAS) for subsequent processing. This data reveals information about the effects of the impact on the crash test dummy and can be correlated to the effects a similar impact would have on a human occupant.

In order to obtain more accurate test data, test engineers attempt to maximize what is known as the "biofidelity" of the crash test dummy. Biofidelity is a measure of how well the crash test dummy reacts like a human being in a vehicle impact test environment. A crash test dummy reacting as an actual human during a collision is said to have a high biofidelity. Accordingly, a crash test dummy having a high biofidelity will provide more accurate information from a collision test relative to the effect of the collision on a human being. Thus, ATD design engineers design crash test dummies with the proper anthropometry that reflects a total weight, center of gravity, mass moment of inertia and range of motion similar to that of a human body so as to increase the biofidelity of the crash test dummy.

However, it has been difficult to replicate the human spine for a crash test dummy. In one crash test dummy, a lower lumbar of a spine was fixed and not adjustable.

More current designs of crash test dummies have implemental adjustable spine assemblies. For example, a THOR design has been developed by NHTSA (the National Highway Traffic Safety Administration) as an advanced dummy to replace the Hybrid III dummy specified in Federal Motor Vehicle Safety Standard (FMVSS) 208 of the United States (US) regulations. The THOR design has an upper flexible thoracic spine and a flexible lumbar spine that are sufficient in upright seating posture (typically a 25 degrees seatback angle) for current US regulation testing.

As autonomous vehicle (AV) technology advances, drivers are relieved from driving duty. Without driving duty, the vehicle occupants can work, relax, and be socially engaged with other riders. It was perceived that more vehicle occupants will recline the seat to rest and relax in a more comfort seating posture, especially for long rides. To address the occupant safety in reclined seating posture (i.e., more reclined than the typical 25 degrees seatback angle, such as a 45 degrees seatback angle or a 60 degrees seatback angle) in autonomous vehicles, the THOR-AV dummy was developed to address the seating postures varying from the standard upright seating posture (i.e., the typical 25 degrees seatback angle) to the more reclined posture, and the increased risk of injuries related to submarining of the crash test dummy that were not adequately addressed in THOR dummy.

In particular, spine assemblies for use in a THOR-AV crash test dummy conventionally includes an upper spine assembly that has an upper spine box that is typically mounted to the neck assembly (not shown) and a thoracic middle spine bracket coupled to the upper spine box via an upper spine member. The THOR-AV spine assembly conventionally also includes a lower spine assembly that has a pelvis interface bracket that is typically mounted to the pelvis assembly and optionally includes a lower thoracic spine load cell that is coupled to the pelvis interface bracket, as well as a rigid spine adjustment joint that is coupled to thoracic middle spine bracket. In addition, the spine adjustment joint of the THOR-AV spine assembly is coupled to the pelvis interface bracket via a lower spine assembly (i.e., the lower spine assembly couples the pelvis interface bracket to the spine adjustment joint).

As noted above, to couple the upper spine assembly to the lower spine assembly, the THOR-AV crash test dummy conventionally includes a rigid spine adjustment joint positioned between the upper and lower spine assembly that allows the upper spine assembly to be adjusted relative to the lower spine assembly to provide a desired seat for the crash test dummy when positioned on a seat prior to collision testing. While the THOR-AV crash test dummy having the rigid spine adjustment joint is able to achieve a desired seatback angle, it was found that the overall design did not achieve the desired human-like response (i.e., biofidelity) due to its lack of bending flexibility in the region corresponding to the positioning of the rigid spine adjustment joint.

The present disclosure provides a modified design for the spine adjustment joint that improve the dummy's biofidelity in both upright and reclined seating postures.

SUMMARY OF THE DISCLOSURE

Accordingly, the present disclosure provides a spine adjustment joint for use in a spine assembly of an anthropomorphic device that is used to couple an upper spine assembly to a lower spine assembly and that is configured for adjusting a seatback angle of the spine assembly.

The spine adjustment joint includes a lower bracket which is coupled to the lower spine assembly and an upper bracket which is coupled to the upper spine assembly. The spine adjustment joint also includes a joint member at least partially formed of an elastomeric material that that is coupled to each of the upper and lower brackets and provides flexibility between the upper and lower spine assembly. The spine assembly also includes at least one fastener passing through one of the upper or lower bracket that is mounted to the joint member that secures the upper spine assembly at a desired angular position relative to the lower spine assembly. The upper bracket is pivotable relative to lower bracket prior to the upper spine assembly being secured to the lower spine assembly using the at least one fastener to adjust the spine adjustment joint to various angular positions corresponding to desired seatback angles for the anthropomorphic device corresponding to the human initial seating postures for crash test simulations when the device is positioned upon a vehicle seat. In certain embodiments, the joint member includes a thoracic plate member which is disposed onto a top surface of the joint member, while in other embodiments the thoracic plate member is positioned within the joint member between its top surface and its base portion or is otherwise defined by the elastomeric joint member, with the at least one fastener being secured to the joint member through the thoracic plate member.

The modified THOR-AV design for the crash test dummy including the modified spine adjustment joint according to the present disclosure overcomes the deficiencies in the THOR-AV design that includes the spine assembly having the rigid spine adjustment joint in that the new design is able to achieve a desired angular position so that the crash test dummy can be positioned at the desired seatback angle and achieve a desired human-like response (i.e., biofidelity) during crash test simulations in both upright and reclined seating postures. In particular, the inclusion of joint member at least partially formed of an elastomeric material within the spine adjustment joint disposed between thoracic plate member and the lower bracket provides a proper spinal bending response during crash test simulations that more closely corresponds to a natural human-like response at the various seatback angles as compared to the rigid spine adjustment joint that it replaces. In particular, the joint member allows the spine adjustment joint to be flexed in any direction during a crash test simulation that more closely approximates the natural movement of a human spine in a similar crash simulation in both upright and reclined seating postures. Moreover, the introduction of the combination of adjustment openings in the upper interface bracket that can be aligned with the corresponding openings in the thoracic plate member allows for accurate and repeatable alignment of the spine assembly of the THOR-AV crash test dummy at the desired seatback angle.

Other features and advantages of the present disclosure will be readily appreciated, as the same becomes better understood, after reading the subsequent description taken in conjunction with the accompanying drawings.

DESCRIPTION OF THE PREFERRED EMBODIMENT(S)

The present disclosure is directed to a modified spine adjustment joint for an anthropomorphic test device, sometimes alternatively referred to as a crash test dummy. In particular, the modified spine adjustment joint according to the present disclosure is suitable for replacing a rigid spine adjustment joint that is used in an upper spine assembly and lower spine assembly of a previous version of a THOR-AV crash test dummy.

The crash test dummy described herein (i.e., the modified THOR-AV crash test dummy) is of a fiftieth percentile (50%) male type and is used primarily to test the performance of automotive interiors and restraint systems for adult front and rear seat occupants. The size and weight of the crash test dummy are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

Figure 1:
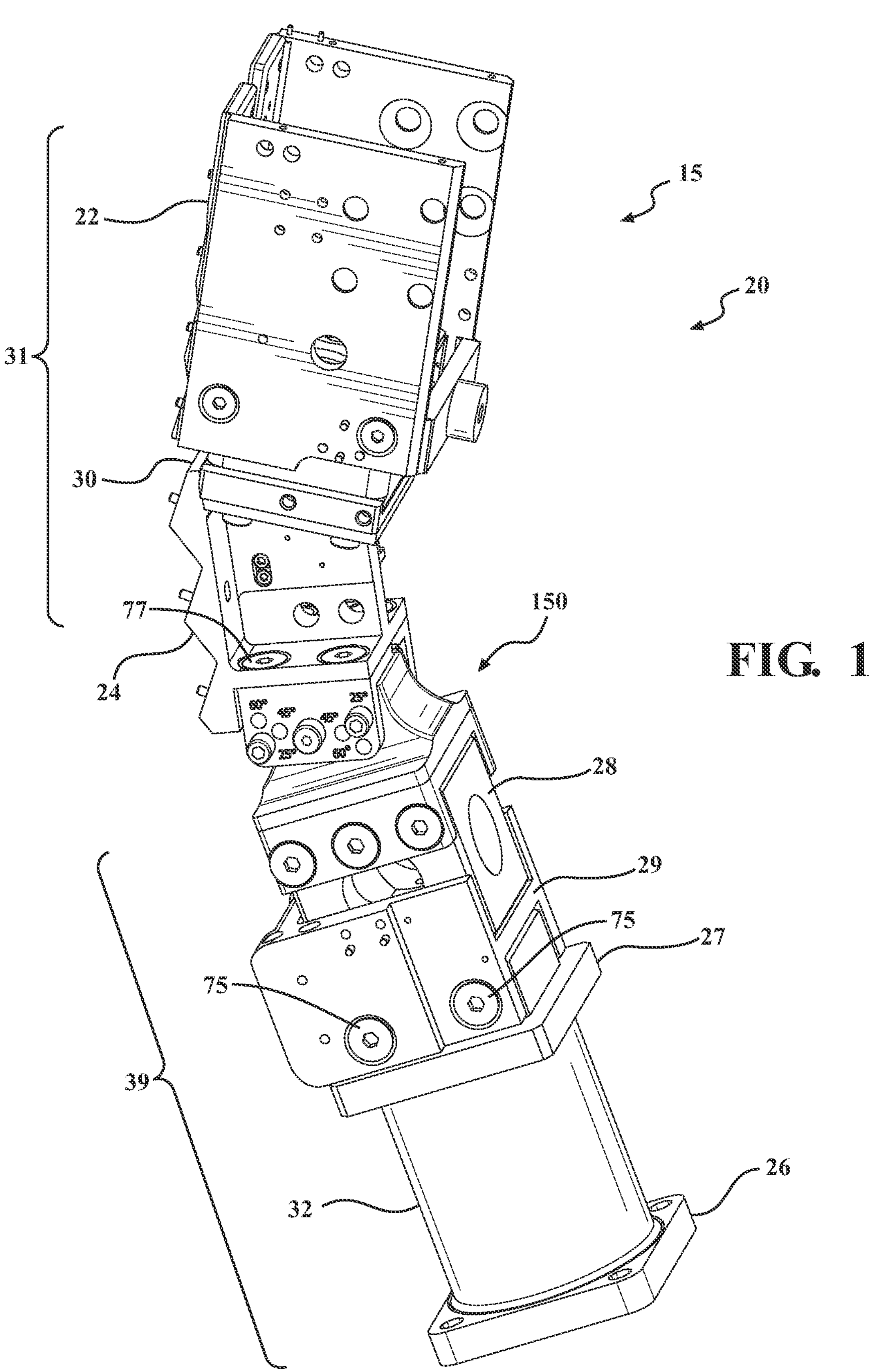
FIG. 1 a perspective view of a spine assembly for use in a THOR-AV crash test dummy in accordance with the prior art.
Figure 2:
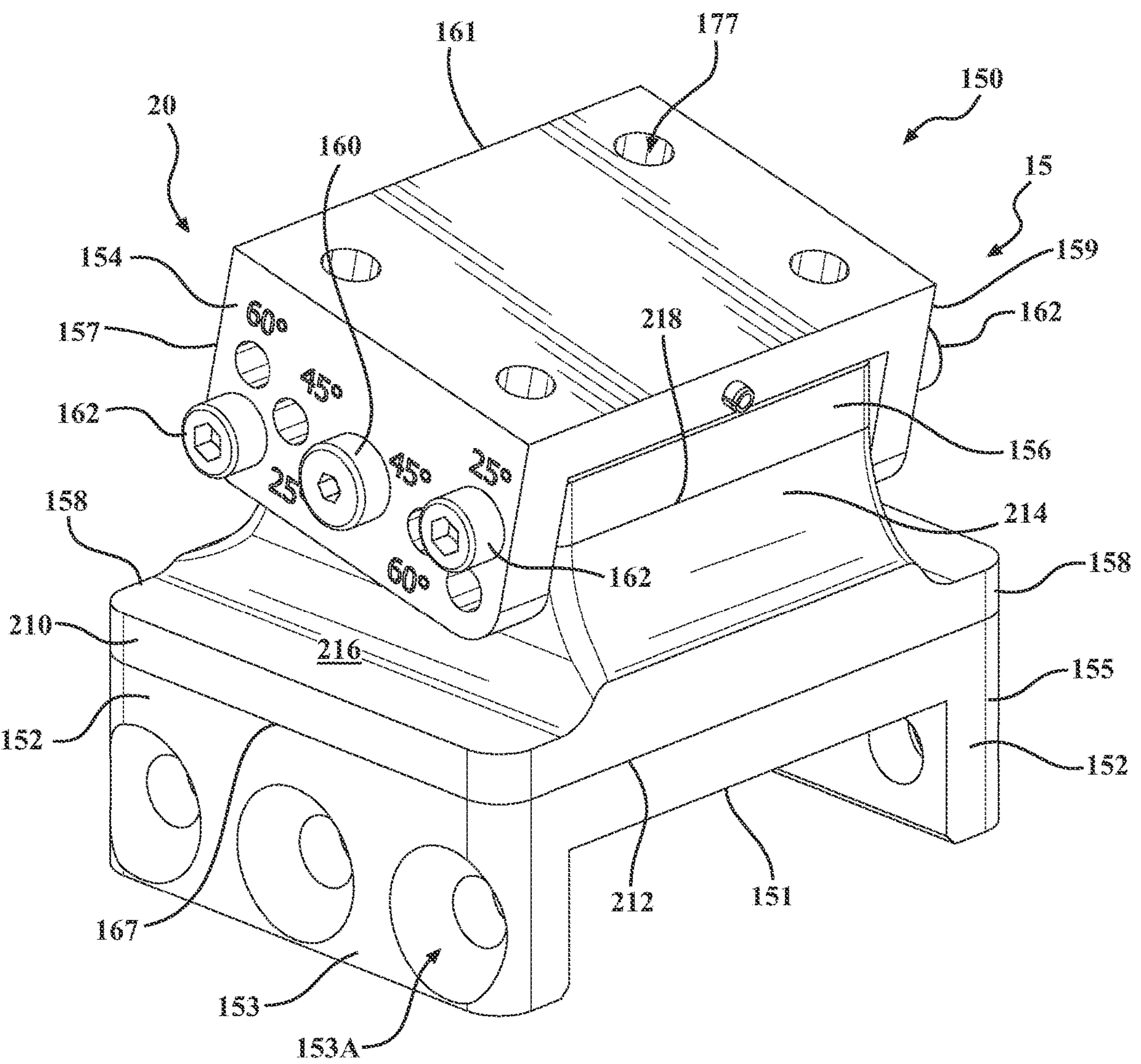
FIG. 2 is a perspective view of a spine adjustment joint of FIG. 1 adjusted for a seatback angle of 25 degrees.

In general, and while not illustrated herein, the crash test dummy, and in particular the THOR-AV crash test dummy (a portion of the THOR-AV crash test dummy as shown in FIG. 1 is identified by reference numeral 15 as described below) in accordance with the present disclosure, includes a head assembly and a neck assembly having an upper end mounted to the head assembly. The crash test dummy 15 includes a spine assembly (shown in FIG. 1 by reference numeral 20 as described below) having an upper end mounted to the neck assembly. The spine assembly 20 has a lower end extending into a torso area of the crash test dummy and is connected to a thoracic spine load cell. The crash test dummy 15 further includes a pelvis assembly coupled to the lower end of the spine assembly. The torso area of the crash test dummy also includes a rib cage assembly connected to the spine assembly. The crash test dummy 15 also has a pair of arm assemblies including a left arm assembly and a right arm assembly. The crash test dummy 15 further includes a pair of leg assemblies including a left leg assembly and a right leg assembly which are coupled to the pelvis assembly. It should be appreciated that various components of the crash test dummy are covered in a urethane skin such as a flesh and skin assembly (partially shown) for improved coupling with the skeleton of the crash test dummy.

In particular, as shown in FIG. 1, one embodiment of a spine assembly 20 for use in a THOR-AV crash test dummy 15 in accordance the subject disclosure includes an upper spine box 22 that is typically mounted to the neck assembly (not shown). A thoracic middle spine bracket 24 is coupled, and preferably flexibly coupled, to the upper spine box 22 via an upper spine member 30. Collectively, the upper spine box 22, the thoracic middle spine bracket 24, and the upper spine member 30 may be referred to as an upper spine assembly 31.

The spine assembly 20 also includes a pelvis interface bracket 26 that is typically mounted to the pelvis assembly (not shown) and includes an optional lower thoracic spine load cell or load cell structural replacement 28 that is coupled to the pelvis interface bracket 26. The spine assembly 20 also includes a spine adjustment joint 150 that is coupled to thoracic middle spine bracket 24. In addition, the spine adjustment joint 150 is coupled to an interface bracket 29, which is coupled to a top portion 27 of a lower spine member 32, and then coupled to the pelvis interface bracket 26 via the lower spine member 32 (i.e., the lower spine member 32 couples the pelvis interface bracket 26 to the spine adjustment joint 150). Collectively, the pelvis interface bracket 26, the optional lower thoracic spine load cell or the load cell structural replacement 28, and the lower spine member 32 may be referred to as a lower spine assembly 39.

Referring now to FIGS. 2-8, the spine adjustment joint 150 in accordance with an exemplary embodiment, includes a lower bracket 152, here illustrated as a u-shaped lower bracket 152, which is coupled to the optional lower thoracic spine load cell or the load cell structural replacement 28 of the lower spine assembly 39, with the lower spine member 32 used therefore to couple the pelvis interface bracket 26 to the lower bracket 152. The spine adjustment joint 150 also includes an upper bracket 154, here illustrated as u-shaped upper bracket 154, which is coupled to the thoracic middle spine bracket 24 of the upper spine assembly 31. The lower bracket 152 includes a top surface 163 that defines a first plane 200 (see FIG. 7), while the upper bracket 154 also includes a top surface 255 which defines a second plane 202 (see FIG. 7). A seatback angle is defined as the angle of the spine assembly 20 of the crash test dummy 15 that is positioned on a vehicle seat (not shown) for the modified THOR-AV crash dummy 15 prior to collision testing (i.e., the angle between a plane along the back portion of the vehicle seat and the seat bottom portion of the vehicle seat (not shown)), and the seatback angle of the spine assembly 150 is adjusted to correspond to this seatback angle by adjusting an angular position of the upper spine assembly 31 relative to the lower spine assembly 39, with the angular position defined herein and corresponding to an angle $\alpha'$ (see FIG. 7) created between the first plane 200, defined along the top surface 163 of the lower bracket 152, and the second plane 202, defined along the top surface 255 of the upper bracket 154. In other words, the angular position defined as the angular measurement created between the first plane 200 and second plane 202 corresponds to a particular seatback angle of the spine assembly when the dummy 15 is positioned onto a vehicle seat adjusted to the same seatback angle (i.e., the angle between the seat portion and back portion of a vehicle seat (not shown) for a crash test simulation The lower bracket 152, is preferably in the form of a u-shaped bracket including a pair of spaced apart flanges 153, 155 (i.e., a first flange 153 and a second flange 155) extending from a base portion 151 which is seated onto the lower spine assembly 39. Each one of the flanges 153, 155 preferably defines one or more respective openings 153A, 155A through which one or more fastening elements 75 (see FIG. 1) may be inserted to secure the lower bracket 152 to the lower spine assembly 39.

The upper bracket 154, as noted above, is preferably formed as a u-shaped bracket including a pair of spaced apart flanges 157, 159 (i.e., a first flange 157 and a second flange 159) extending transverse from a base portion 161. The base portion 161 further defines a top surface 255, with the top surface 255 of the base portion 161 coupled to the upper spine assembly 31 in the assembled state. In particular, the base portion 161 defines one or more openings 177 through which fasteners 77 (see FIG. 1) may be inserted to secure the upper bracket 154 to the upper spine assembly 31.

In the embodiments shown, the lower bracket 152 and upper bracket 154 may be formed from a hard metal or metal alloy, such as steel, and are preferably pre-manufactured by conventional metal forming techniques such as stamping, forging, casting, machining, etc.

Each of the spaced apart flanges 157, 159 defines a respective central opening 170, a pair of intermediate adjustment openings 172 disposed on the respective flanges 157, 159 in opposite directions relative to the central opening 170 and equidistant from the central opening 170. In addition, each of the spaced apart flanges 157, 159 also define a first pair of outer adjustment openings 174 and a second pair of outer adjustment openings 176 disposed in opposite directions relative to the central opening 170 and outwardly of the respective intermediate adjustment openings 172 (i.e., each respective intermediate adjustment opening 172 is disposed between the central opening 170 and one set of outer adjustment openings 174, 176, with each of the respective intermediate adjustment openings 172 and central opening 170 disposed equidistant from the base portion 161 (i.e., the respective intermediate adjustment openings 172 and central opening 170 are aligned along an axis that is parallel to first plane 200). Still further, the respective outer adjustment openings 174, 176 are aligned such that each upper adjustment opening 176 is disposed closer to the base portion 161 than each respective outer adjustment opening 176 such that the alignment of one pair of the outer adjustment openings 174, 176 define an axis that runs transverse to the axis defined by the respective intermediate adjustment openings 172 and central opening 170 that is parallel to the first plane 200. In certain embodiments, the one pair of the outer adjustment openings 174, 176 are disposed equidistant from the respective adjacent intermediate adjustment opening 172 and thus form an axis that is normal to the axis defined along the respective intermediate adjustment openings 172 and central opening 170 and normal to the first plane 200.

The three pairs of adjustment openings 172, 174, 176 represent three sets of hole patterns that provide the ability to adjust spine adjustment joint 150 for three desired seatback angles at 45 degrees, 25 degrees and 60 degrees respectively (i.e., three desired angular positions of the upper spine assembly 31 relative to the lower spine assembly 39 that correspond to the three desired seatback angles at 45 degrees, 25 degrees and 60 degrees respectively when the anthropomorphic device 15 is placed upon a vehicle seat for collision testing, as noted above), as will be explained further below. For ease of description hereinafter, the use of the term seatback angle corresponds to the angular position of the upper spine assembly 31 relative to the lower spine assembly 39 as defined between the first plane 200 and second plane 202 as noted above.

Figure 3:
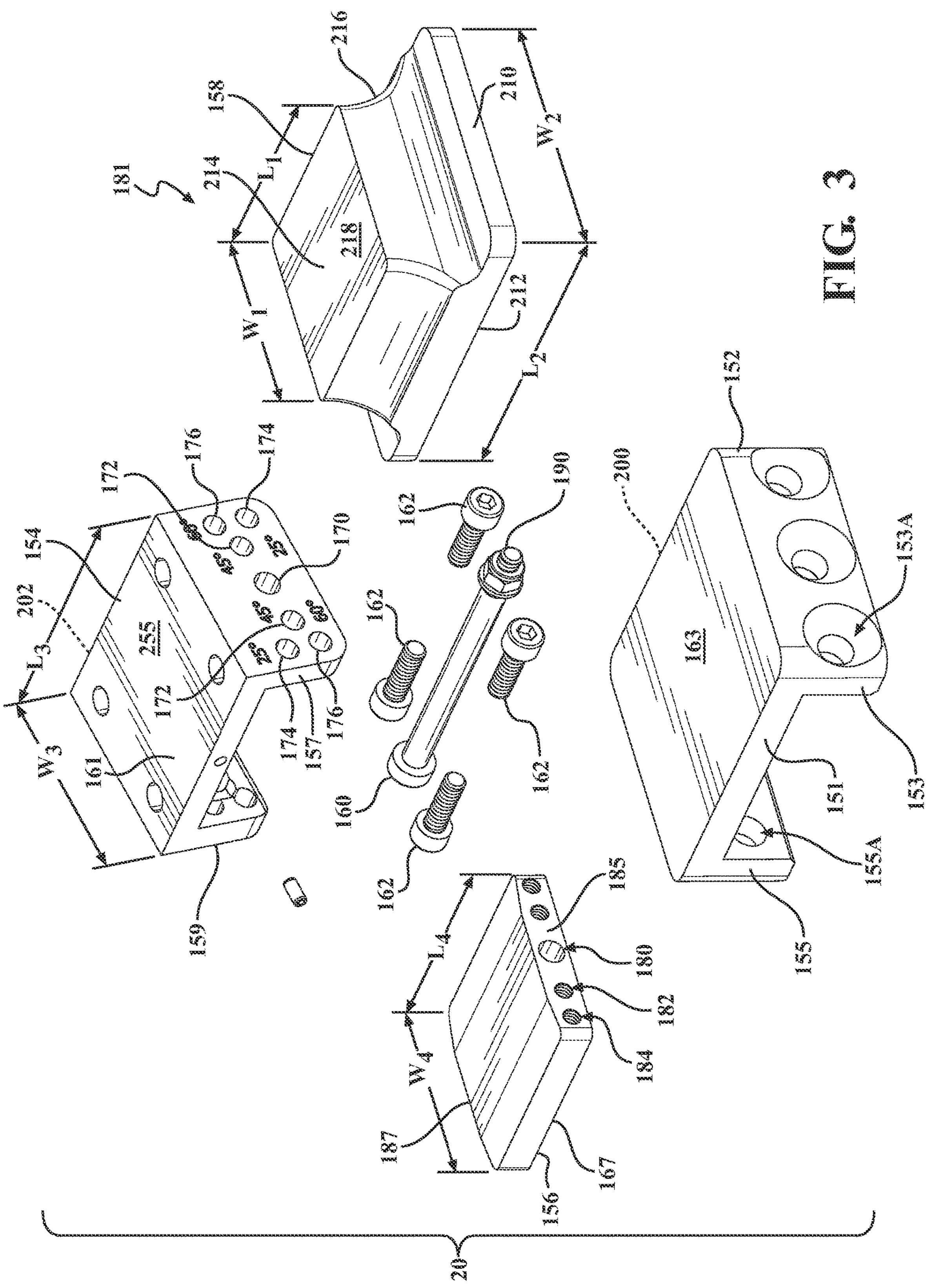
FIG. 3 is an exploded view of FIG. 2.
Figures 4, 5:
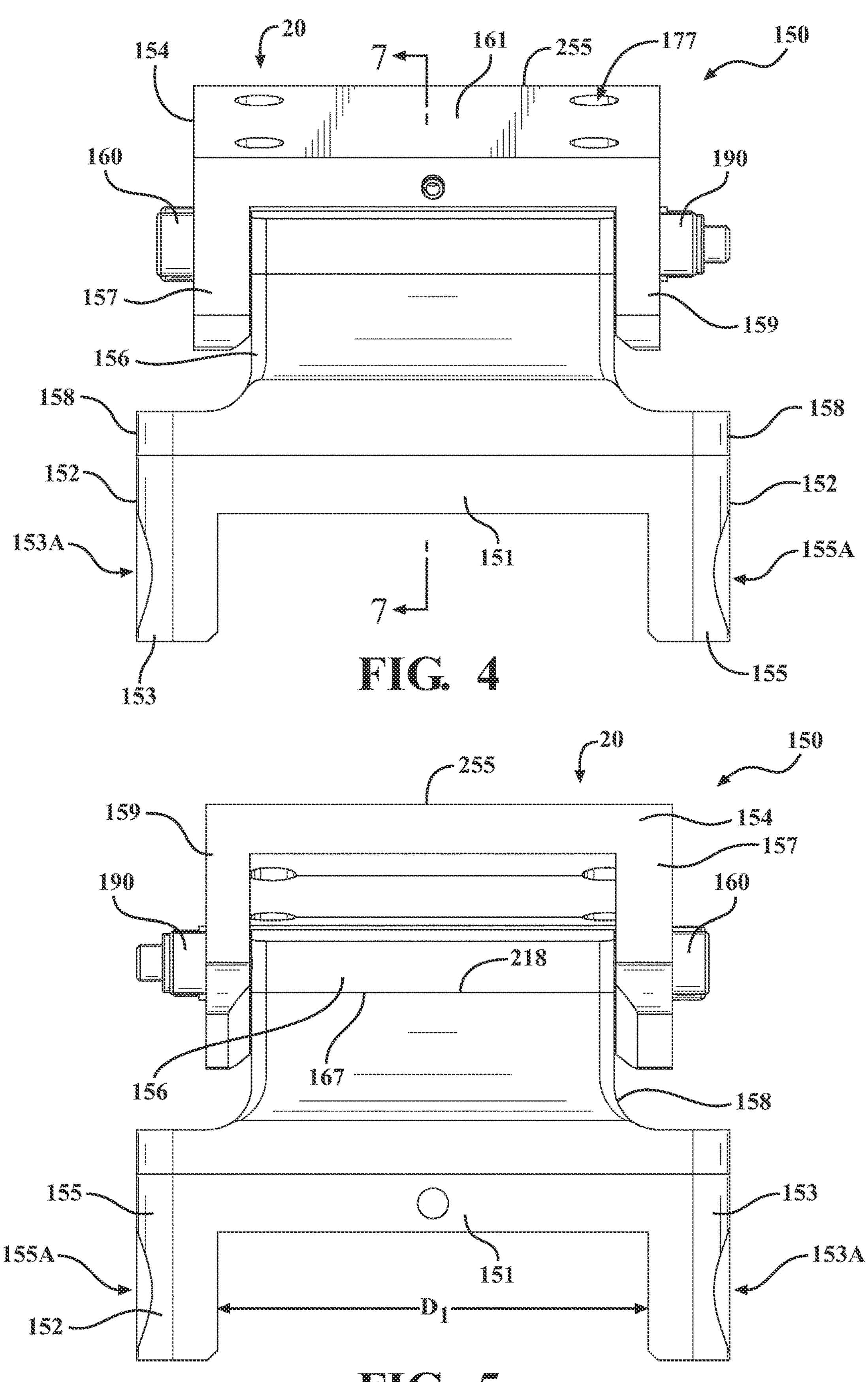
FIG. 4 is a front view of FIG. 2.
FIG. 5 is a rear view of FIG. 4.
Figure 6:
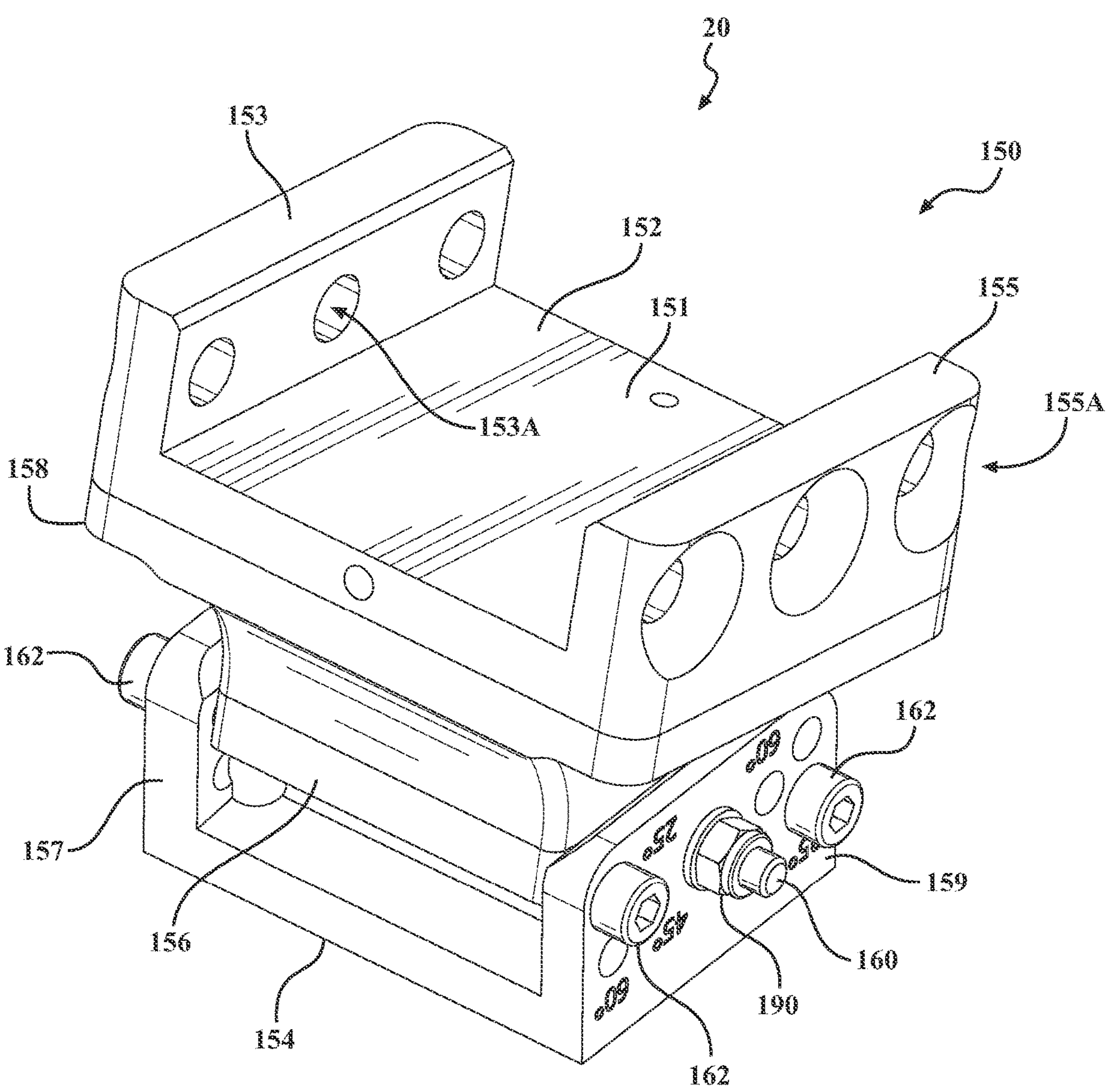
FIG. 6 is bottom perspective view of FIG. 2.
Figure 7:
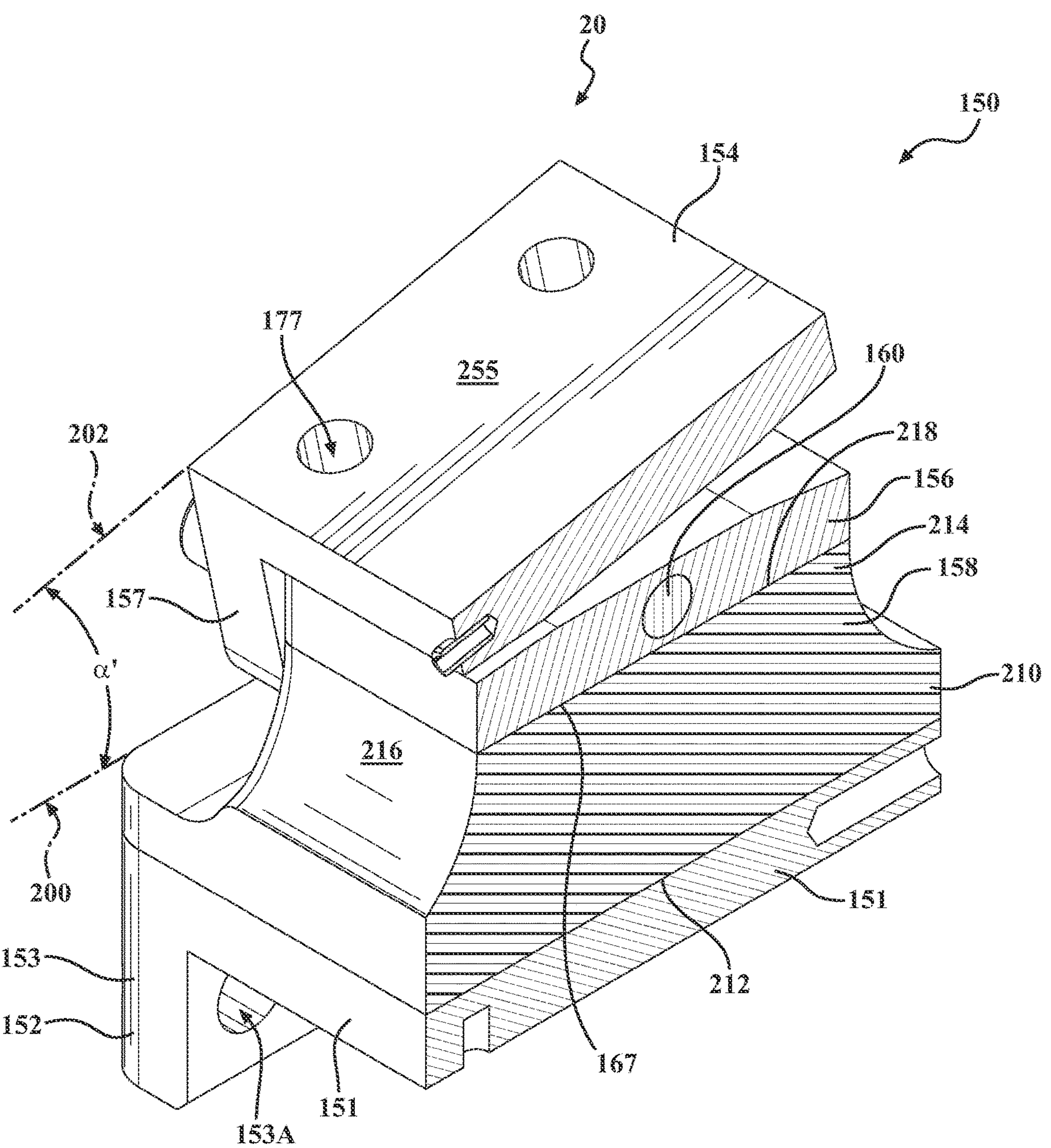
FIG. 7 is a section view of FIG. 4 taken along line 7-7.

In certain embodiments, as shown in FIG. 3, the central opening 170 and three pairs of adjustment openings 172, 174, 176 in each of the spaced apart flanges 157, 159 are not threaded, but instead each define a circular bore. However, in other embodiments, one or more of the adjustment openings 172, 174, 176 in one or both of the spaced apart flanges 157, 159 may be threaded.

The spine adjustment joint 150 also includes a joint member 158 which includes an elastomeric component 181 and thoracic plate member 156. The joint member 158 is positioned between and coupled to each of the upper bracket 154 and the lower bracket 152.

The elastomeric component 181 of the joint member 158 includes a base region 210 having a bottom surface 212, here shown as a flat bottom surface 212, that has a length and width that generally corresponds to the length and width of the base portion 151 of the lower bracket 152 such that the base region 210 is seated onto the base portion 151 of the lower bracket 152 with the bottom surface 212 adjacent to the top surface 163 of the lower bracket 152 when assembled. The elastomeric component 181 of the joint member 158 also includes a projection region 214 extending from the base region 210 that includes side regions 216, here shown as arcuate side regions 216, that terminate into a top surface 218, preferably flat top surface 218, having a length L1 and width W1 that are each respectively shorter than the corresponding respective length L2 and width W2 of the base region 210 (see FIG. 3). In addition, the length L1 of the top surface 158 of the projection region 214 is less than the distance D1 (see FIG. 5) between the inner surfaces of the flanges 157 and 159, while the width W1 corresponds to the width W3 of the upper bracket 154 (see also FIG. 3). In certain embodiments, the length L2 of the base region 210 corresponds to the length L3 of the upper bracket 154 (see also FIG. 3).

Preferably, the joint member 158 may be at least partially formed, or entirely formed, of a flexible or elastomeric material, typically a flexible polymeric material such as rubber, and thus may alternatively be referred to herein as an elastomeric member 158 or flexible member 158 or elastomeric joint member 158 (as shown in FIGS. 1-8) or flexible joint member 158. In particular, the elastomeric component 181 of the joint member 158 is preferably formed from the elastomeric material. One exemplary rubber that is utilized as the elastomeric material is neoprene (i.e., polychloroprene) rubber. In certain other embodiments, as opposed to formed from an elastomeric material, the joint member 158 may be formed from a flexible material such as a polymer, a plastic, a metal or metal alloy that also provides a sufficient degree of flexibility corresponding in general to the properties of an elastomeric material. The degree of flexibility for either the flexible material or elastomeric material is provided such that the spine adjustment joint 150 of the spine assembly 20 provides a human-like response in crash test simulations as compared to prior rigid spine adjustment joints in both upright and reclined seating postures.

As best shown in FIG. 3, the thoracic plate member 156 defines a central opening 180, a pair of intermediate openings 182, and a pair of outer openings 184 that extend parallel to one another between a pair of side surfaces 185, 187. In certain embodiments, as also shown in FIG. 3, the surface of the one or more of the openings 182, 184 includes threadings (i.e., one or more of the openings 182, 184 in the thoracic plate member 156 is a threaded opening 182 and/or 184 (i.e., a threaded intermediate opening 182 and/or a threaded outer opening 184), while in other embodiments such openings 182 and/or 184 may be non-threaded. Preferably, however, the central opening 180 is not threaded, and defines a smooth central bore. The thoracic plate member 156 preferably has a length L4 and width W4*t* that corresponds to the length L1 and width W1 of the flat top surface 218 of the joint member 158.

In certain embodiments, such as shown in FIGS. 4-8, the thoracic plate member 156 is disposed on the elastomeric component 181 in an assembled state, with the bottom surface 167 of the thoracic plate member 156 positioned adjacent to the top surface 218 of the projection region 214 of the elastomeric component 181. Alternatively, however, in an embodiment not shown, the thoracic plate member 156 may be disposed within the elastomeric component 181 between the top surface 218 of the projection region 214 and the base region 210.

In certain embodiments, such as shown in FIGS. 4-8, the thoracic plate member 156, similar to the lower bracket 152 and upper bracket 154, may be formed from a hard metal or metal alloy, such as steel, and are preferably pre-manufactured by conventional metal forming techniques such as stamping, forging, casting, etc.

In still further embodiments (not shown), a portion of the thoracic plate member 156 is integrally formed with the elastomeric component 181 and may thus be formed at least in part from the same material as the elastomeric component 181. In these embodiments, the thoracic plate member 156 includes cylindrical metal tubes that further define the one or more of the openings 180, 182, 184 which are disposed within the elastomeric material of the elastomeric component 181 of the joint member 158 and not be in the form of a plate having the openings 180, 182, 184 and the bottom surface 167 and side surfaces 185, 187 as illustrated in the Figures.

Also, while the lower bracket 152, thoracic plate member 156 and elastomeric component 181 are shown as separate uncoupled components in the exploded view of FIG. 3, preferably these components are coupled together as a single part defining the joint bracket 158 prior to further assembly with the upper bracket 154.

In particular, the pre-manufactured lower bracket 152 and thoracic plate member 156 are loaded into a mold, such as a compressing mold and placed in spaced arrangement to one another. The elastomeric material is introduced within the mold between lower bracket 152 and thoracic plate member 156 and is cooled to form the elastomeric component 181 of the joint member 158, which adheres to each of the top surface 163 of the lower bracket 152 and to the bottom surface 167 of the thoracic plate member 156 (in embodiments such as in FIGS. 4-8 wherein the thoracic plate member 156 includes the side surface 185, 187 and bottom surface 167) to secure the lower bracket 152 to the thoracic plate member 156 in the embodiment as shown in FIGS. 4-8. Alternatively, wherein the thoracic member 156 is positioned within the projection region 214 in the alternative embodiments, the elastomeric material of the elastomeric component 181 at least partially surrounds the thoracic plate member 156 on its top and bottom surface 167 while the side surface 185, 187 of the thoracic plate member 156 remain uncovered such that the openings 180, 182, 184 are exposed. Still further, in certain embodiments, the elastomeric material of the elastomeric component surrounds the plurality of metal cylinders of the thoracic plate member 156 of the alternative embodiments wherein the thoracic plate member 156 does not includes the side surface 185, 187 and bottom surface 167, and thus a portion of the elastomeric material of the projection region 214 corresponds to the plate region of the thoracic plate member 156 such as in FIGS. 4-8 is therefore integral with the projection region 214 of the elastomeric component 181 and formed from the elastomeric material used to form the elastomeric component 181.

In certain embodiments, a fastener or fasteners (such as screws, bolts, etc.—not shown) may also be utilized to secure the joint member 158 to one or both of the lower bracket 152 and the thoracic plate member 156. Still further, an adhesive (not shown) may be applied onto the top surface 163 of the lower bracket 152 and/or onto the bottom surface 167 of the thoracic plate member 156 prior to the introduction of the introduction of the elastomeric material into the mold, and thus functions to increase the adherence of joint member 158 to the top surface 163 of the lower bracket 152 and/or onto the bottom surface 167 of the thoracic plate member 156, respectively.

In the assembled state, the central opening 180 of the thoracic plate member 156 is axially aligned with the respective pair of central openings 170 of the spaced apart flanges 157, 159 of the upper bracket 154 and are configured to receive a pivot bolt 160 (or pivot pin in other embodiments) therethrough to rotatably couple the upper bracket 154 to the thoracic plate member 156 (and hence rotatably couple the upper bracket 154 to the lower bracket 152). The pivot bolt 160 or pivot pin allows the thoracic plate member 156 to be pivotally secured to the upper bracket 154 but wherein the thoracic plate member 156 (and hence the lower bracket 152) is still pivotable relative to the upper bracket 154 about the length of the pivot bolt 160 or pin (or vice versa). Accordingly, the upper spine assembly 31 is therefore pivotally coupled to the lower spine assembly 39 via the flexible spine adjustment joint 150.

In certain embodiments, such as shown in FIG. 3, the pivot bolt 160 is in the form of a shoulder bolt that includes a head and a shaft extending from the head that is threaded at the end opposite the head (i.e., the pivot bolt 160 is a threaded pivot bolt 160), and a lock nut 190 is coupled to the threaded shaft of the pivot bolt 160 to rotatably secure the upper bracket 154 to the thoracic plate member 156 via the pivot bolt 160.

The spine adjustment joint 150 also includes a series of one or more fasteners 162, here shown as four bolts 162, that are introduced through (i.e., pass through) a respective one of the adjustment openings 172, 174, 176 (preferably unthreaded adjustment openings 172, 174, 176 as shown in FIG. 3) of the upper bracket 154 which are secured within a corresponding aligned one of the openings 182, 184 (preferably threaded openings 182, 184 as shown in FIG. 3) of the thoracic plate member 156 to secure the upper bracket 154 to the thoracic plate member 156 (and prevent rotation of the upper bracket 154 relative to the thoracic plate member 156) at the desired angular position. Similar to the pivot bolt 160, and as also shown in FIG. 3 and in certain embodiments, each of the bolts 162 also include a head and a shaft extending from the head that is threaded (i.e., each of the fasteners 162 are threaded bolts 162), that pass through a respective one of the adjustment openings 172, 174, 176 of the upper bracket 154 and are threadingly engaged/secured with a corresponding aligned one of the threaded openings 182, 184 of the thoracic plate member 156 to secure the upper bracket 154 to the thoracic plate member 156 (and prevent rotation of the upper bracket 154 relative to the thoracic plate member 156) at the desired angular position.

Figure 8A:
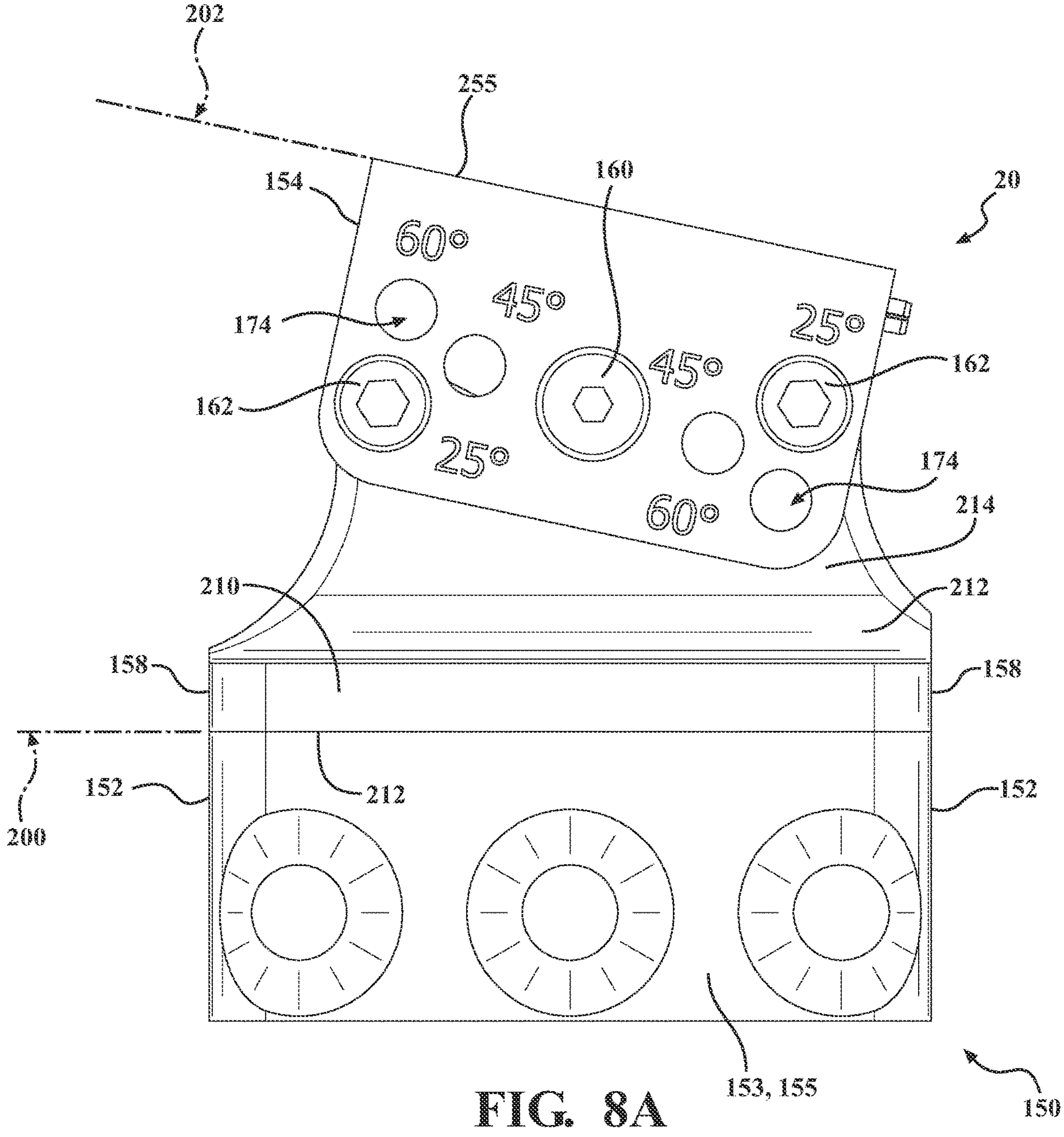
FIG. 8A is front view of FIG. 2 adjusted for a seatback angle of 25 degrees.
Figure 8B:
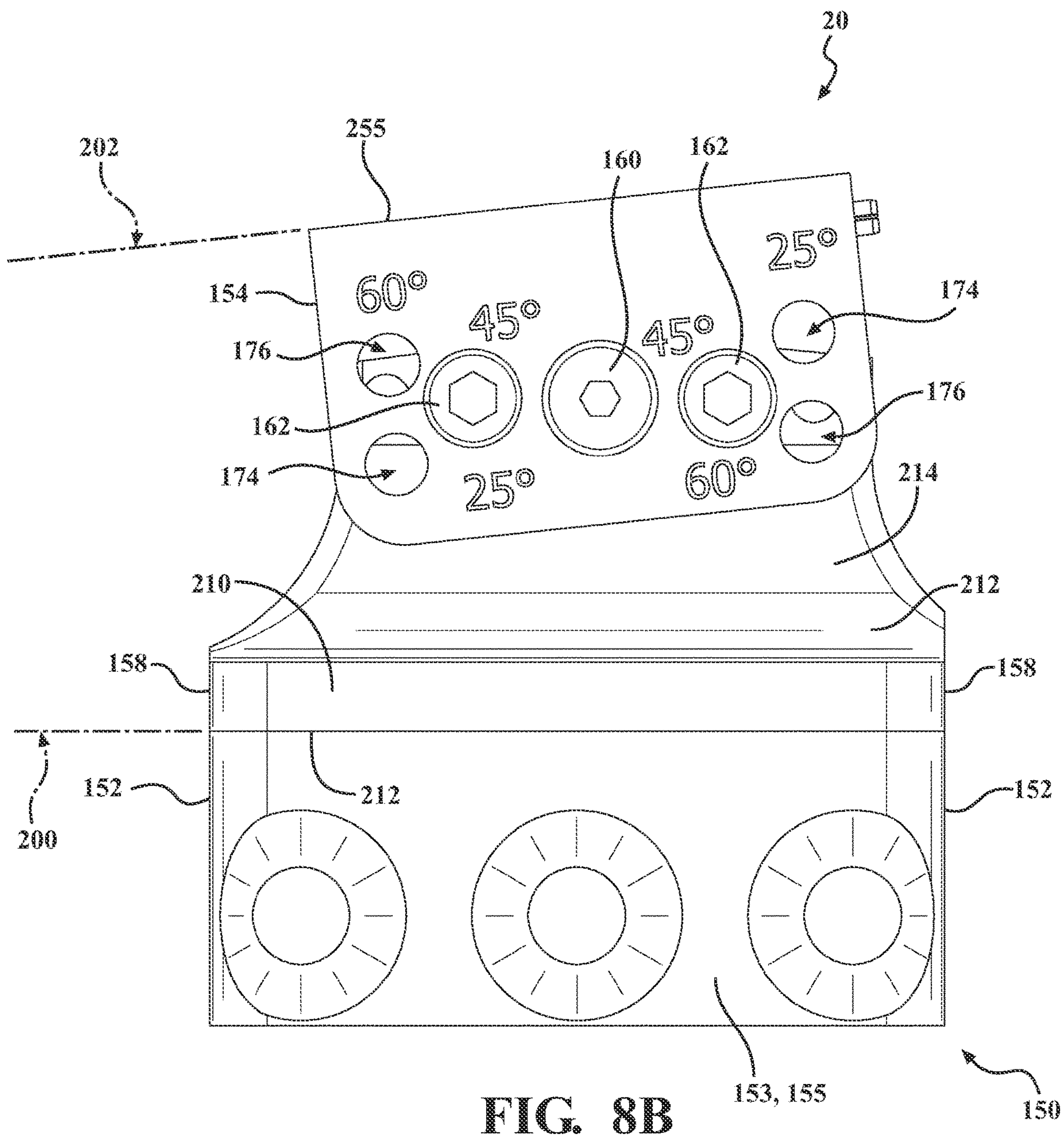
FIG. 8B is front view of FIG. 2 adjusted for a seatback angle of 45 degrees.
Figure 8C:
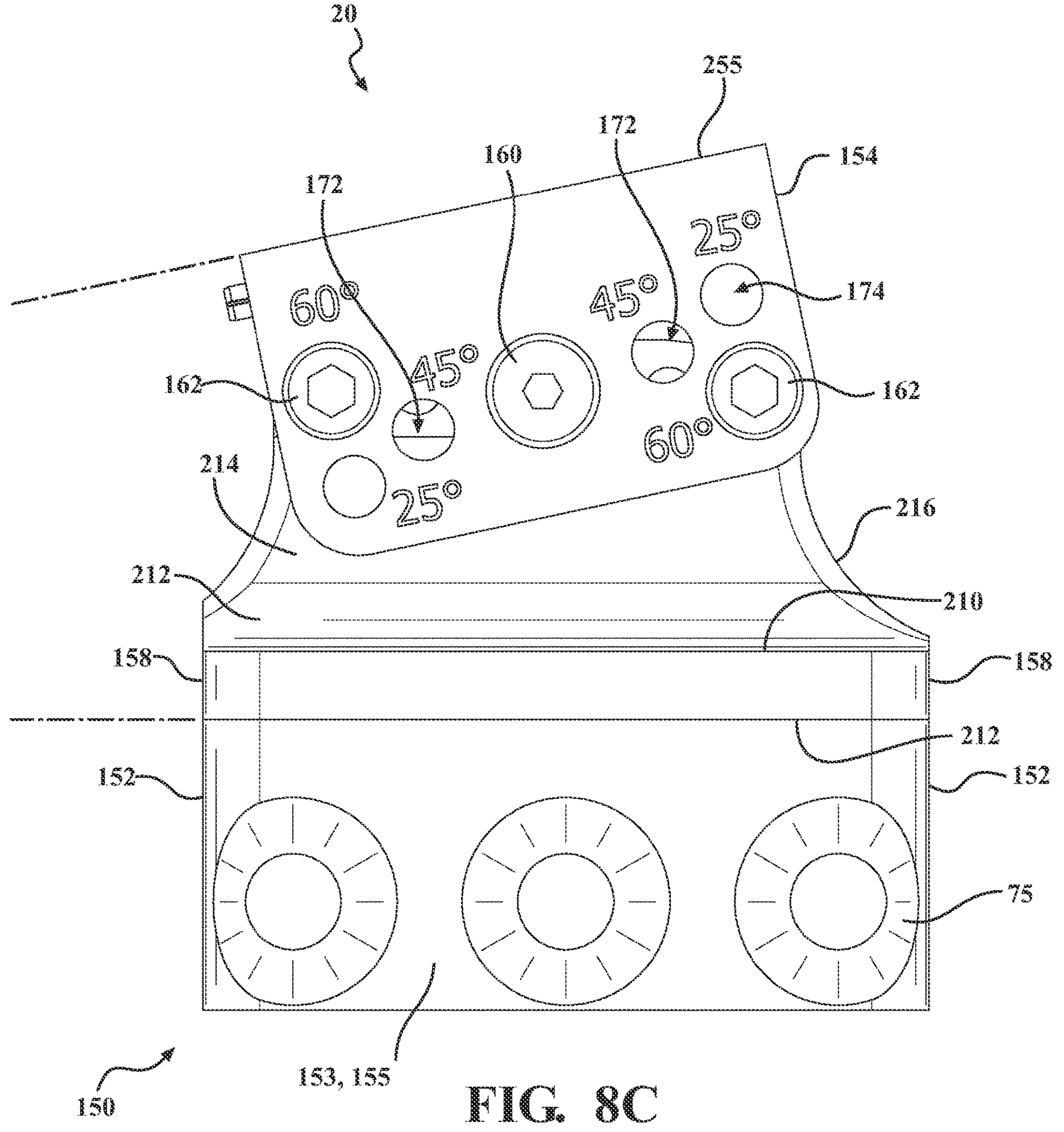
FIG. 8C is front view of FIG. 2 adjusted for a seatback angle of 60 degrees.

FIGS. 8A, 8B and 8C illustrate where the spine adjustment joint 150 is adjusted for a particular angular position of the upper spine assembly 31 relative to the lower spine assembly 39 (corresponding to a desired seatback angle of 25 degrees, 45 degrees, and 60 degrees of the spine assembly 20 of the crash test dummy 15 (i.e., a first, second and third desired seatback angle of the plurality of desired seatback angles) when the anthropomorphic device is positioned on a seat for collision teste), respectively.

To adjust the seatback angle to 25 degrees (i.e., a first desired seatback angle and corresponding to a first angular position defined by the angle between the first and second plane 200, 202) and subsequently secure the thoracic plate member 156 to the upper bracket 154, as shown in FIG. 8A, the following procedure is used. First, with the fasteners 162 removed (i.e., not extending through (i.e., passing through) the upper bracket 154 or engaged with/secured with the thoracic plate member 156), the upper bracket 154 is pivoted about an axis defined by the length of the pivot bolt 160 (and also by the aligned central openings 170, 180 through which the pivot bolt 160 extends and is secured) relative to the thoracic plate member 156 until such time wherein each opening of the pairs of outer adjustment openings 174 are aligned with a corresponding one of the respective outer openings 184 of one of the respective sides 185, 187 of the thoracic plate member 156. In this position, the respective outer adjustment openings 176 and intermediate adjustment openings 172 are correspondingly not aligned with the respective openings 182, 184 in the thoracic plate member 156.

The fastener 162 is then introduced through (i.e., passes through) one aligned pair of the outer adjustment openings 174 and outer openings 184. Another respective fastener 162 is then introduced through (i.e., passes through) the other aligned pair of the outer adjustment openings 174 and outer openings 184. In certain embodiments, the outer openings 184 are threaded (i.e., are threaded outer openings 184, as shown in FIG. 3), as are the fasteners 162 (i.e., are threaded fasteners 162 in the form of threaded bolts 162, as also shown in FIG. 3). As such, the fasteners 162 are thus threadingly engaged with (i.e., secured with) the threading in the outer openings 184 to secure the respective fastener 162 to the thoracic plate member 156. In this position, an axis defined by the middle of the installed fasteners 162 and pivot bolt 160 are parallel to the first plane 200 (as also shown in FIG. 3).

To adjust the seatback angle to 45 degrees (i.e., the second desired seatback angle different from the first desired seatback angle and corresponding to a second angular position different than the first angular position defined by the angle between the first and second plane 200, 202) and subsequently secure the thoracic plate member 156 to the upper bracket 154, as shown in FIG. 8B, the following procedure is used. First, with the fasteners 162 removed, the upper bracket 154 is pivoted about an axis defined by the length of the pivot bolt 160 relative to the thoracic plate member 156 until such time wherein each opening of the pairs of intermediate adjustment openings 172 are aligned with a corresponding one of the respective intermediate openings 182 of one of the respective sides 185, 187 of the thoracic plate member 156. In this position, the respective outer adjustment openings 174, 176 are correspondingly not aligned with the respective openings 184 in the thoracic plate member 156. The fastener 162 is then introduced through one aligned pair of the intermediate adjustment openings 172 and intermediate openings 182. Another respective fastener 162 is then introduced through (i.e., passes through) the other aligned pair of the intermediate adjustment openings 172 and intermediate openings 182. In certain embodiments, the intermediate openings 182 are threaded (i.e., are threaded intermediate openings 182), as are the fasteners 162 (i.e., the fasteners 162 are threaded fasteners 162, as described above). As such, the threaded fasteners 162 are thus threadingly engaged with the threading in the threaded intermediate openings 182 to secure the respective fastener 162 to the thoracic plate member 156. In this position, an axis defined by the middle of the installed fasteners 162 and pivot bolt 160 are parallel to the first plane 200.

To adjust the seatback angle to 60 degrees (i.e., the third desired seatback angle different from the respective first and second desired seatback angle corresponding to a third angular position different than the first and second angular position) and subsequently secure the thoracic plate member 156 to the upper bracket 154, as shown in FIG. 8C, the following procedure is used. First, with the fasteners 162 removed, the upper bracket 154 is pivoted about an axis defined by the length of the pivot bolt 160 relative to the thoracic plate member 156 until such time wherein each opening of the pairs of outer adjustment openings 176 are aligned with a corresponding one of the respective outer openings 184 of one of the respective sides 185, 187 of the thoracic plate member 156. The fastener 162 is then introduced through (i.e., passes through) one aligned pair of the outer adjustment openings 176 and outer openings 184. In this position, the respective outer adjustment openings 174 and intermediate adjustment openings 172 are correspondingly not aligned with the respective openings 182, 184 in the thoracic plate member 156. Another respective fastener 162 is then introduced through the other aligned pair of the outer adjustment openings 176 and outer openings 184. In certain embodiments, the outer openings 184 are threaded outer openings 184, as described above, and the fasteners 162 are threaded fasteners 162, as also described above. As such, the threaded fasteners 162 are thus threadingly engaged with (i.e., secured with) the threading in the threaded outer openings 184 to secure the threaded fastener 162 to the thoracic plate member 156. In this position, an axis defined by the middle of the installed fasteners 162 and pivot bolt 160 are parallel to the first plane 200.

In certain embodiments in accordance with FIGS. 8A-9C, as opposed to utilizing a pair of fasteners 162 for securing each respective flange 157 and 159 of the upper bracket 154 to the thoracic plate member 156, a single fastener 162 can be used for securing each respective flange 157 and 159 of the upper bracket 154 to the thoracic plate member 156. In these embodiments, each respective flange 157 and 159 of the upper bracket 154 may only include therefore a single adjustment opening 172, 174, 176, on one side of the central opening 170 as opposed to the pair of adjustment openings 172, 174, 176 on opposite sides of the central opening 170 as illustrated in FIGS. 1-8.

While the present disclosure as illustrated in FIGS. 1-8 provides for adjustment of the desired seatback angle to 25 degrees, 45 degrees, and 60 degrees respectively (i.e., the first, second and third desired seatback angles in accordance with the illustrated embodiment as described above), it is specifically contemplated that modifications may be made as to the locations and alignment of the pairs of adjustment openings 172, 174, 176 in the upper bracket 154 in combination with adjustments in locations of the openings 182, 184 to allow for the adjustment of the seatback angle to any position between 0 degrees and 90 degrees (i.e., any other desired seatback angle).

The modified THOR-AV design for the crash test dummy 15 including the flexible spine adjustment joint 150 according to the present disclosure as illustrated in FIGS. 1-8 overcomes the deficiencies in the THOR-AV design and including the spine assembly 20 having the rigid spine adjustment joint in accordance with prior THOR-AV designs in that the new design is able to achieve the desired seatback angle and also achieve a desired human-like response (i.e., biofidelity) during crash test simulations in both upright and reclined seating postures. In particular, the inclusion of the joint member 158 within the spine adjustment joint 150 partially formed of an elastomeric material provides a proper spinal bending response during crash test simulations that more closely corresponds to a natural human-like response at the various seatback angles as compared to the rigid spine adjustment joint 150 that it replaces. In particular, the flexible, solid, or elastomeric material of the elastomeric component 181 of the joint member 158 allows the spine adjustment joint 150 to be flexed in any direction (i.e., flexing along any axis) during a crash test simulation that more closely approximates the natural movement of a human spine in a similar crash simulation in both the upright and reclined posture. Moreover, the introduction of the combination of adjustment openings 172, 174, 176 in the upper bracket 154 that can be aligned with the corresponding openings 182, 184 in the thoracic plate member 156 allows for accurate and repeatable alignment of the spine assembly 20 of the THOR-AV crash test dummy 15 at the desired seatback angle that could not be achieved with the prior THOR-AV design and including the spine assembly 20 having the rigid spine adjustment joint 150 in the prior THOR-AV design.

While the embodiments shown herein illustrate the spine adjustment joint 150 oriented such that the upper bracket 154 is coupled to the upper spine assembly 31 and the lower bracket 152 is coupled to the lower spine assembly 39, the orientation of the spine adjustment joint 150 can be oriented upside down, i.e., wherein the upper bracket 154 becomes a lower bracket coupled to the lower spine assembly 39 and wherein the lower bracket becomes an upper bracket coupled to the upper spine assembly 31, and wherein the additional components of the spine adjustment joint 150 are repositioned accordingly to otherwise maintain the same assembly when fully assembled in the spine assembly 20 of the crash test dummy 15.

The present disclosure has been described in an illustrative manner. It is to be understood that the terminology, which has been used, is intended to be in the nature of words of description rather than of limitation.

Many modifications and variations of the present disclosure are possible in light of the above teachings. Therefore, the present disclosure may be practiced other than as specifically described.

What is claimed is:

1. A spine assembly for an anthropomorphic test device, said spine assembly comprising:

an upper spine assembly;

a lower spine assembly; and a spine adjustment joint for providing a desired angular position of said upper spine assembly relative to said lower spine assembly, said spine adjustment joint comprising:

an upper bracket coupled to said upper spine assembly, a lower bracket coupled to said lower spine assembly, a joint member at least partially formed of an elastomeric material and coupled to and positioned between each of said upper bracket and said lower bracket with said joint member providing flexibility between said upper spine assembly and said lower spine assembly; and at least one fastener passing through one of said upper bracket and said lower bracket and mounted to said joint member to secure said upper spine assembly in the desired angular position relative to said lower spine assembly.

2. The spine assembly of claim 1, wherein said upper bracket includes a pair of spaced apart flanges extending from a base portion with a fastener of said at least one fastener passing through a first one of said pair of spaced apart flanges and with an additional fastener of said at least one fastener passing through a second one of said pair of spaced apart flanges.

3. The spine assembly of claim 1, wherein said joint member comprises:

an elastomeric component secured to one of said upper bracket and said lower bracket; and a thoracic plate member secured to said elastomeric component with said at least one fastener engaging said thoracic plate member to secure said thoracic plate member to one of said upper bracket and said lower bracket.

4. The spine assembly of claim 3, wherein said elastomeric component comprises:

a base region secured to one of said upper bracket and said lower bracket; and a projection region extending from said base region.

5. The spine assembly of claim 4, wherein said thoracic plate member is positioned onto said projection region such that said projection region is between said base region and said thoracic plate member.

6. The spine assembly of claim 4, wherein said projection region includes arcuate side regions that terminate into a top surface, and wherein said thoracic plate member is seated onto said top surface.

7. The spine assembly of claim 2, wherein said joint member comprises:

an elastomeric component secured to one of said upper bracket and said lower bracket; and a thoracic plate member secured to said elastomeric component with said thoracic plate member positioned between said pair of spaced apart flanges and with said at least one fastener engaging said thoracic plate member to secure said thoracic plate member to one of said upper bracket and said lower bracket.

8. The spine assembly of claim 1, wherein said spine adjustment joint further comprises a pivot bolt for pivotally coupling said upper bracket and said lower bracket.

9. The spine assembly of claim 8, wherein said pivot bolt passes through said joint member and one of said upper bracket and said lower bracket.

10. The spine assembly according to claim 9, wherein said upper bracket includes a pair of spaced apart flanges each defining a central opening and with said pivot bolt received within said central opening of each of said pair of spaced apart flanges.

11. The spine assembly of claim 10, wherein said joint member comprises:

an elastomeric component secured to one of said upper bracket and said lower bracket; and a thoracic plate member secured to said elastomeric component with said thoracic plate member defining a central opening extending between a first side surface and a second side surface, and wherein said pivot bolt is received within said central opening of said thoracic plate member.

12. The spine assembly of claim 7, wherein a first one of said pair of said spaced apart flanges defines one or more adjustment openings and wherein said thoracic plate member further defines one or more additional openings extending within a first side surface, wherein a second one of said pair of said spaced apart flanges defines one or more adjustment openings and wherein said thoracic plate member further defines one or more additional openings extending within a second side surface, wherein said fastener of said at least one fastener passes through one of said one or more adjustment openings of said first one of said spaced apart flanges and is secured within an aligned one of said one or more openings extending within said first side surface of said thoracic plate member, and wherein said additional fastener of said at least one fastener passes through one of said one or more adjustment openings of said second one of said spaced apart flanges and is secured within an aligned one of said one or more openings extending within said second side surface of said thoracic plate member.

13. The spine assembly of claim 12 wherein said one or more adjustment openings defined in said first one of said spaced apart flanges includes a pair of intermediate adjustment openings, a first pair of outer adjustment openings, and a second pair of outer adjustment openings, wherein said one or more additional openings defined in said thoracic plate member includes a first pair of outer openings extending within said first side surface on either side of the central opening and a second pair of intermediate openings extending within said first side surface with each respective one of said pair of intermediate openings positioned between said central opening and one of said pair of outer openings, and wherein said fastener of said at least one fastener passes through one of said pair of intermediate adjustment openings in said first one of said pair of spaced apart flanges and is secured within an aligned one of said pair of intermediate openings extending within said first side surface of said thoracic plate member, or wherein said fastener of said at least one fastener passes through a first one of said first pair of outer adjustment openings in said first one of said pair of spaced apart flanges and is secured within an aligned one of said pair of outer openings extending within said first side surface of said thoracic plate member, or wherein said fastener of said at least one fastener passes through a second one of said first pair of outer adjustment openings in said first one of said pair of spaced apart flanges and is secured within said aligned one of said pair of outer openings extending within said first side surface of said thoracic plate member.

14. The spine assembly of claim 12 wherein said one or more adjustment openings defined in said first one and said second one of said spaced apart flanges each include a pair of intermediate adjustment openings, a first pair of outer adjustment openings, and a second pair of outer adjustment openings, wherein said one or more additional openings defined in said thoracic plate member includes a first pair of outer openings extending within said first side surface on either side of the central opening and a second pair of intermediate openings extending within said first side surface with each respective one of said pair of intermediate openings positioned between said central opening and one of said pair of outer openings, wherein said one or more additional openings defined in said thoracic plate member includes a first pair of outer openings extending within said second side surface on either side of the central opening and a second pair of intermediate openings extending within said second side surface with each respective one of said pair of intermediate openings positioned between said central opening and one of said pair of outer openings, and wherein said fastener of said at least one fastener passes through one of said pair of intermediate adjustment openings in said first one of said pair of spaced apart flanges and is secured within an aligned one of said pair of intermediate openings extending within said first side surface of said thoracic plate member and wherein said additional fastener of said at least one fasteners passes through one of said pair of intermediate adjustment openings in said second one of said pair of spaced apart flanges and is secured within an aligned one of said pair of intermediate openings extending within said second side surface of said thoracic plate member.

15. A method for securing a spine assembly for an anthropomorphic test device for use in a crash test simulation at a desired angular position, the spine assembly including an upper spine assembly, a lower spine assembly, a spine adjustment joint, and at least one fastener; the spine adjustment joint including an upper bracket coupled to the upper spine assembly, a lower bracket coupled to the lower spine assembly; a joint member coupled to and positioned between the upper and lower bracket with the joint member having an elastomeric component formed from an elastomeric material and a thoracic plate member coupled to said elastomeric component;

said method comprising:

pivoting the upper bracket to a desired angular position relative to the lower bracket to a desired angular position to adjust the upper spine assembly relative to the lower spine assembly; and passing a fastener of the at least one fastener through one of the upper bracket and the lower bracket and mounting the at least fastener to the joint member to secure the upper spine assembly in the desired angular position relative to said lower spine assembly.

16. The method of claim 15, wherein said upper bracket includes a pair of spaced apart flanges extending from a base portion, wherein a first one of the pair of the spaced apart flanges defines one or more adjustment openings and wherein the thoracic plate member further defines one or more additional openings extending within a first side surface, and wherein the at least one fastener passes through one of the one or more adjustment openings of the first one of the spaced apart flanges and is secured within an aligned one of the one or more openings extending within the first side surface of the thoracic plate member to secure the upper spine assembly in the desired angular position relative to said lower spine assembly.

17. The method of claim 16, wherein a second one of the pair of the spaced apart flanges defines one or more adjustment openings and wherein the thoracic plate member further defines one or more additional openings extending within a second side surface, and wherein the spine assembly includes at least one additional fastener, and wherein said method further comprises:

passing an additional fastener of the at least one additional fastener through one of the one or more adjustment openings of the second one of the spaced apart flanges and securing the additional fastener within an aligned one of the one or more openings extending within the second side surface of the thoracic plate member to secure the upper spine assembly in the desired angular position relative to said lower spine assembly.

* * * * *